United States Patent
Tan et al.

(10) Patent No.: US 7,171,239 B2
(45) Date of Patent: Jan. 30, 2007

(54) SELECTING COMMON FEATURES OF ACCESSORIES COUPLED TO A COMMUNICATIONS DEVICE

(75) Inventors: Cheah Heng Tan, Villa Emas Bayan Lepas (MY); Samuel Chia, Bayan Baru (MY); Fook Teng Fam, Desa Ara (MY); Thean Hai Ooi, Jalan Mayang Pasir Bayan Baru (MY); Tee Hoh Quah, Jalan Mayangpasir Bayan Lepas (MY); Kelvin Teh, Jalan Yeap Chor Ee (MY); Clement Pakiam Tobias Xavier, Taman Pekaka Gelugor (MY)

(73) Assignee: Motorola, Inc., Schaumburg, IL (US)

( * ) Notice: Subject to any disclaimer, the term of this patent is extended or adjusted under 35 U.S.C. 154(b) by 168 days.

(21) Appl. No.: 10/853,069

(22) Filed: May 25, 2004

(65) Prior Publication Data

US 2005/0266871 A1 Dec. 1, 2005

(51) Int. Cl.
*H04M 1/00* (2006.01)
(52) U.S. Cl. ............... 455/557; 455/556.1; 455/556.2; 455/558; 455/559; 455/575.1
(58) Field of Classification Search ............. 455/550.1, 455/556, 552, 559, 551, 566, 569.1, 569.2, 455/585
See application file for complete search history.

(56) References Cited

U.S. PATENT DOCUMENTS

| | | | | |
|---|---|---|---|---|
| 6,012,634 | A * | 1/2000 | Brogan et al. | 235/380 |
| 2003/0078083 | A1* | 4/2003 | Meador | 455/575 |
| 2003/0162562 | A1* | 8/2003 | Curtiss et al. | 455/556 |
| 2005/0064822 | A1* | 3/2005 | Higgins et al. | 455/90.2 |
| 2005/0064905 | A1* | 3/2005 | Pinder | 455/557 |
| 2005/0176461 | A1* | 8/2005 | Bozzone et al. | 455/551 |

* cited by examiner

*Primary Examiner*—Joseph Feild
*Assistant Examiner*—David Q. Nguyen
(74) *Attorney, Agent, or Firm*—Valerie M. Davis

(57) ABSTRACT

A communications device (100) and method (200) for automatically selecting features of accessories (120,140) operatively coupled to the communications device (100). In use the method (100) includes detecting operative coupling (220) of accessories (120,140) to the communications device (100) and then determining (240) a common feature supported by the accessories (120,140). Thereafter, the method (200) provides for selecting (250) one of the accessories (120,140) to provide the common feature the selecting (250) being determined by a sequence of the operative coupling.

17 Claims, 2 Drawing Sheets

SELECTING COMMON FEATURES OF ACCESSORIES COUPLED TO A COMMUNICATIONS DEVICE

FIELD OF THE INVENTION

This invention relates in general to a method and a communications device for automatically selecting features of accessories operatively coupled to such a communications device. The invention is particularly useful for, but not necessarily limited to, selecting common features of accessories operatively coupled to two-way radios.

BACKGROUND OF THE INVENTION

Many of today's communications devices, such as two-way radios and cellular telephones, connect to an array of accessories such as Public Speaker Microphones (PSMs) and Vehicular Adaptors (VAs). Some of these accessories, often referred to as "smart" accessories, contain an embedded non-volatile memory. When the accessory is operatively coupled to a communications device, the embedded non-volatile memory is used to provide data that identifies the accessory and its associated features (functions) that complements or replaces features of the communications device. When a "smart" accessory with an embedded non-volatile memory is operatively coupled to a communications device, the data contents of the non-volatile memory, such as accessory device type and function capability data (features), can be read by the device's processor. An example of an embedded non-volatile memory is a 1-Wire® bus Electrically Erasable Programmable Read Only Memory (EEPROM) available from Dallas Semiconductor. A 1-Wire® bus is a single wire power and data communications bus system that has a single bus master, typically a microcontroller, and one or more slaves.

Today, there is a trend towards allowing multiple accessories to be simultaneously operatively coupled to a communications device such as a two-way radio. For example, consider the two accessories one being a Public Speaker Microphone (PSM) and the other being a Vehicular Adapter (VA), when both of these accessories are operatively coupled to a compatible communications device, common features, that are common to the accessories, must be determined and the appropriate one of the accessories must be selected to provide one of the common features. To achieve the selection of an accessory to provide a common feature, differentiation of multiple accessories, and identification of their common features, can be provided by the data contents stored in their respective embedded non-volatile memories. However, a need exists for automatically selecting features of accessories operatively coupled to the communications device.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for automatically selecting features of accessories operatively coupled to a communications device, the method comprising:

detecting operative coupling of at least two accessories to the communications device;

determining a common feature supported by the accessories; and selecting one of the accessories to provide the common feature to the communications device, the selecting being determined by a sequence of the operative coupling.

Suitably, the detecting further includes storing the sequence of the operative coupling of the at least two accessories, wherein the accessories are a first coupled accessory and at least one further coupled accessory, the first coupled accessory being operatively coupled to the communications device before the further coupled accessory.

Preferably, the selecting is characterized by the communications device directly controlling the common feature on a selected accessory.

Suitably, the selecting is characterized by the selected accessory being addressed by use of an accessory identifier stored in an embedded memory of a selected accessory.

Preferably, the selecting is characterized by selecting the second coupled accessory to provide the common feature to the communications device.

Suitably, the storing includes allocating incremental count values associated with each of the accessories in an order in which the accessories are operatively coupled to the communications device.

Preferably, the common features include a radio communications feature. Suitably, the common features include audio communications.

Preferably, the determining may be characterized by comparing features identified in memory locations of embedded memories of each associated accessory.

Preferably, the method is further characterized by the common features are features supported by the communications device without the accessories being coupled thereto.

Suitably, the method includes a further step of re-selecting one of the accessories to provide the common feature to the communications device, the re-selecting being effected by removal of one of the accessories and the re-selecting being determined by the sequence of the operative coupling.

According to another aspect of the invention there is provided a communications device for automatically selecting features of accessories when operatively coupled thereto, the communications device comprising:

a processor;

a user interface operatively coupled to the processor; and accessory ports operatively coupled to the processor, wherein in use when at least two accessories are operatively coupled to respective ones of the ports to allow communication between the accessories and the processor, the processor selects a selected one of the accessories to provide a common feature supported by the accessories, the selected one of the accessories being determined by a sequence in which the accessories were operatively coupled to the ports.

Suitably, in use the processor stores the sequence of the at least two accessories being operatively coupled to respective ones of the ports, wherein the accessories are a first coupled accessory and at least one further coupled accessory, the first coupled accessory being operatively coupled to the communications device before the second coupled accessory.

Preferably, the second coupled accessory provides the common feature.

Preferably, the common feature is supported by the communications device without the accessories being coupled thereto.

Suitably, in use, the processor stores the sequence by allocating incremental count values associated with each of the accessories in an order in which the accessories are operatively coupled to the communications device.

Preferably, the selected one of the accessories is determined by the processor comparing features identified in memory locations of embedded memories of each associated accessory that is operatively coupled to respective ones of the ports.

Suitably, in use, the processor provides for re-selecting one of the accessories to provide the common feature to the communications device, the re-selecting being effected by removal of one of the accessories and the re-selecting being determined by the sequence in which the accessories were operatively coupled to the ports.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF THE PREFERRED EMBODIMENT OF THE INVENTION

Figure 1:
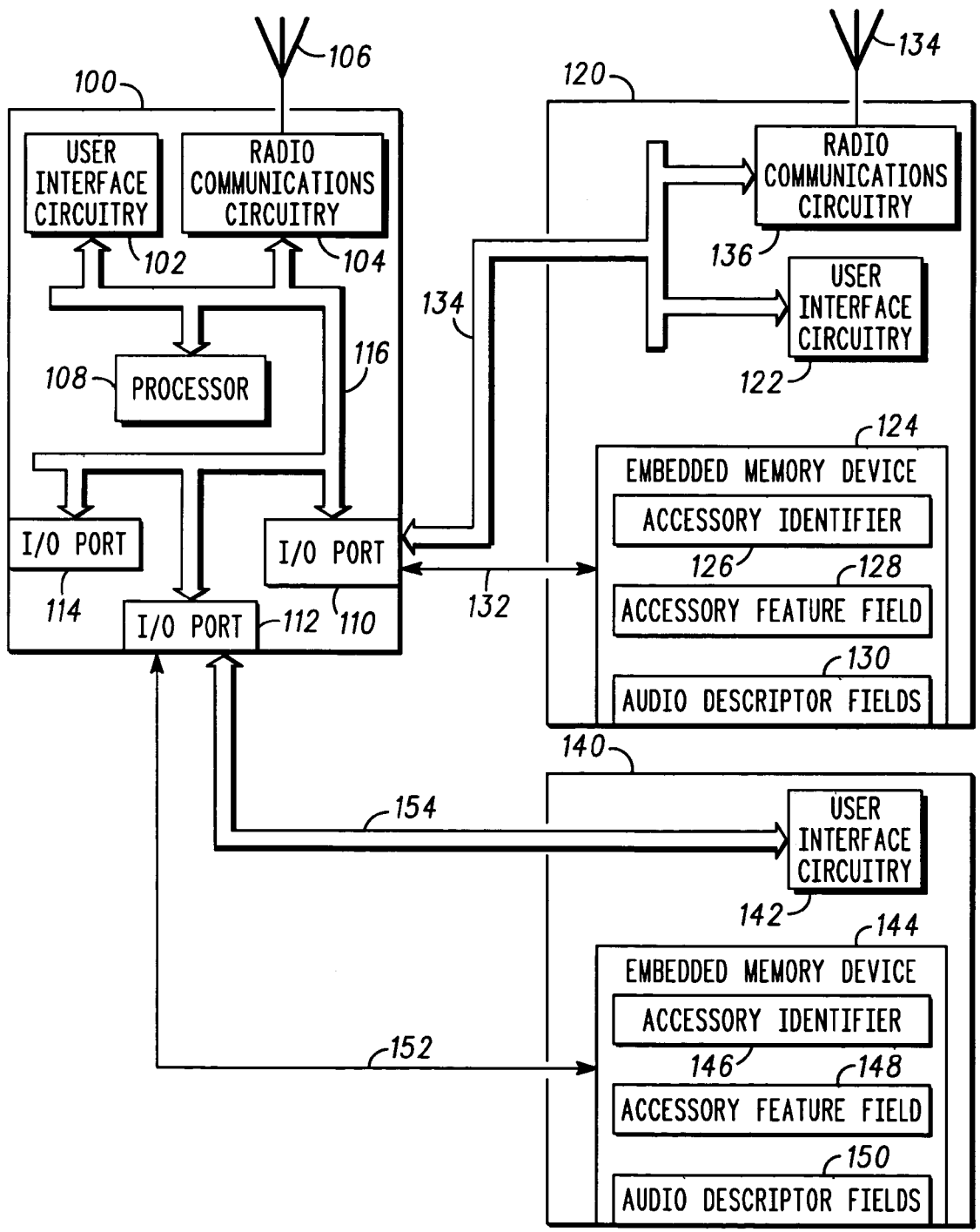
FIG. 1 is a schematic block diagram of a communications device in the form of a two-way radio with operatively coupled accessories in accordance with the present invention.

In the drawings, like numerals on different Figs are used to indicate like elements throughout. Referring now to FIG. 1, there is illustrated a schematic block diagram of a communications device in the form of a two-way radio 100 in accordance with a preferred embodiment of the present invention. The two-way radio 100 is operatively coupled to two remote accessories 120,140. The remote accessories 120,140 can be typically selected from a group of accessories including: a remote speaker microphone, a Public Speaker Microphone (PSM), a headset, a Vehicular Adapter (VA) or other accessory. The two-way radio 100 includes a processor 108, a user interface 102 operatively coupled to the processor 108 by a data and address bus 116. Also, Input Output (I/O) ports in the form of accessory ports 110,112, 114 are operatively coupled to the processor 108 by the data and address bus 116. In this preferred embodiment the accessory ports 110,112,114 include a conventional bus interface (CBI) and an additional 1-Wire® bus interface. Although, in this preferred embodiment, there is an additional 1-Wire® bus interface is used for its simplicity, those skilled in the art will recognize parallel and other serial bus memories may be used. For instance, the CBI could be used to replace the functionality of the 1-Wire® bus interface.

The two-way radio 100 also has radio communications circuitry 104 operatively coupled to an antenna 106 through an antenna port, the radio communications circuitry 104 also being operatively coupled to the processor 108 by the data and address bus 116. The radio communications circuitry 104 includes a Radio Frequency (RF) Amplifier, Modulation and Demodulation Circuitry, Frequency Synthesis Circuitry, filtering circuitry and other typical RF circuitry as will be apparent to a person skilled in the art.

Both of the accessories 120, 140 include respective user interface circuitry 122,142, which may include, amongst other, optional switches, a speaker and/or microphone and may also include a visual display unit. Also, accessory 120 includes radio frequency communications circuitry 132 coupled to an antenna 134. In accordance with the present invention, accessories 120, 140 include a respective embedded non-volatile memory often called an Embedded Memory Device (EMD) 124,144 such as a 1-Wire® EEPROM. The Embedded Memory Device (EMD) 124 contains an accessory identifier 126, an accessory feature field 128 and an Audio Descriptor field 130. Similarly, the Embedded Memory Device EMD 144 contains an accessory identifier 146, an accessory feature field 148 and an Audio Descriptor field 150.

As illustrated, accessory 120 is a Public Speaker Microphone (PSM) and therefore has radio communications circuitry 136 operatively coupled to an antenna 134 through an antenna port The radio communications circuitry 132 includes a Radio Frequency (RF) Amplifier, Modulation and Demodulation Circuitry, Frequency Synthesis Circuitry, filtering circuitry and other typical RF circuitry as will be apparent to a person skilled in the art.

The user interface circuitry 122 and radio communications circuitry 136 of accessory 120 are operatively coupled to the accessory port 110 by a conventional bus architecture 134. Also, the embedded memory device (EMD) 124 is operatively coupled to accessory port 110 by is 1-Wire® bus 132 that includes power supply conductors (VCC and Ground) for providing power to accessory 120. Similarly, the user interface circuitry 142 of accessory 140 is operatively coupled to accessory port 112 by a conventional bus architecture 154. Also, the embedded memory device (EMD) 144 is operatively coupled to accessory port 112 by a 1-Wire® bus 152 that includes power supply conductors (VCC and Ground) for providing power to accessory 140.

As described above, in this embodiment, the respective embedded memory devices (EMDs) 124, 144, for each of the respective accessories 120, 140, is a 1-Wire® bus EEPROM with 4 bytes allocated for the Accessory Identifier 126 or 146. The Accessory Identifier 126 or 146 is used to look up the barest accessory characteristics stored in memory in the processor 108. Table 1 shows the memory organization hierarchy for both of the embedded memory devices (EMDs) 124,144.

TABLE 1

| Memory Offset (Hex) | Contents |
| --- | --- |
| 0x0000 | 4-byte Accessory ID String |
| 0x0004 | 2-byte Accessory Feature Field |
| 0x0006 | 1-byte Audio Descriptor Field |
| 0x0007 | 1-byte Audio Descriptor Field |
| . . . | . . . |
| -EOF- | blank space (don't care) |

In accordance with the present invention, the audio descriptor fields 130, 150 embody information about the audio capability or acoustic performance of their respective accessories 120, 140 including, interface parameters, performance models, suggested equalizer filters, and operational limits. The audio descriptor fields 130, 150 can contain arbitrary amounts of data that follows some established format to allow parsing by the two-way radio 100.

Specific audio parameters are stored in fields 130, 150. In a given accessory, all audio parameters can be stored in a single descriptor field, all parameters could be stored in separate descriptor fields, or parameters can be grouped in descriptor fields logically. Logical grouping, the preferred approach, facilitates re-use because like parameters tend to be all present or all absent in a given accessory.

The accessory feature fields 128, 148 are 2-byte coded fields that identify up to 16 features provided by the accessories 120 or 140. For example, the Least Significant Bit (LSB) identifies an audio output feature is available on the accessory. The second LSB identifies an audio input feature is available and the third LSB indicates that a radio communications feature is available on the accessory. Thus, for instance, considering accessory 120 the three LSBs of the accessory feature field 128 would be 111 thereby identifying: audio output feature; an audio input feature; and a frequency communications feature. In contrast, considering accessory 140 the three LSBs of the accessory feature field 148 would be 011 thereby identifying: audio output feature and an audio input feature (the "0" in the third LSB indicates there is no frequency communications feature available/supported by accessory 140).

Figure 2:
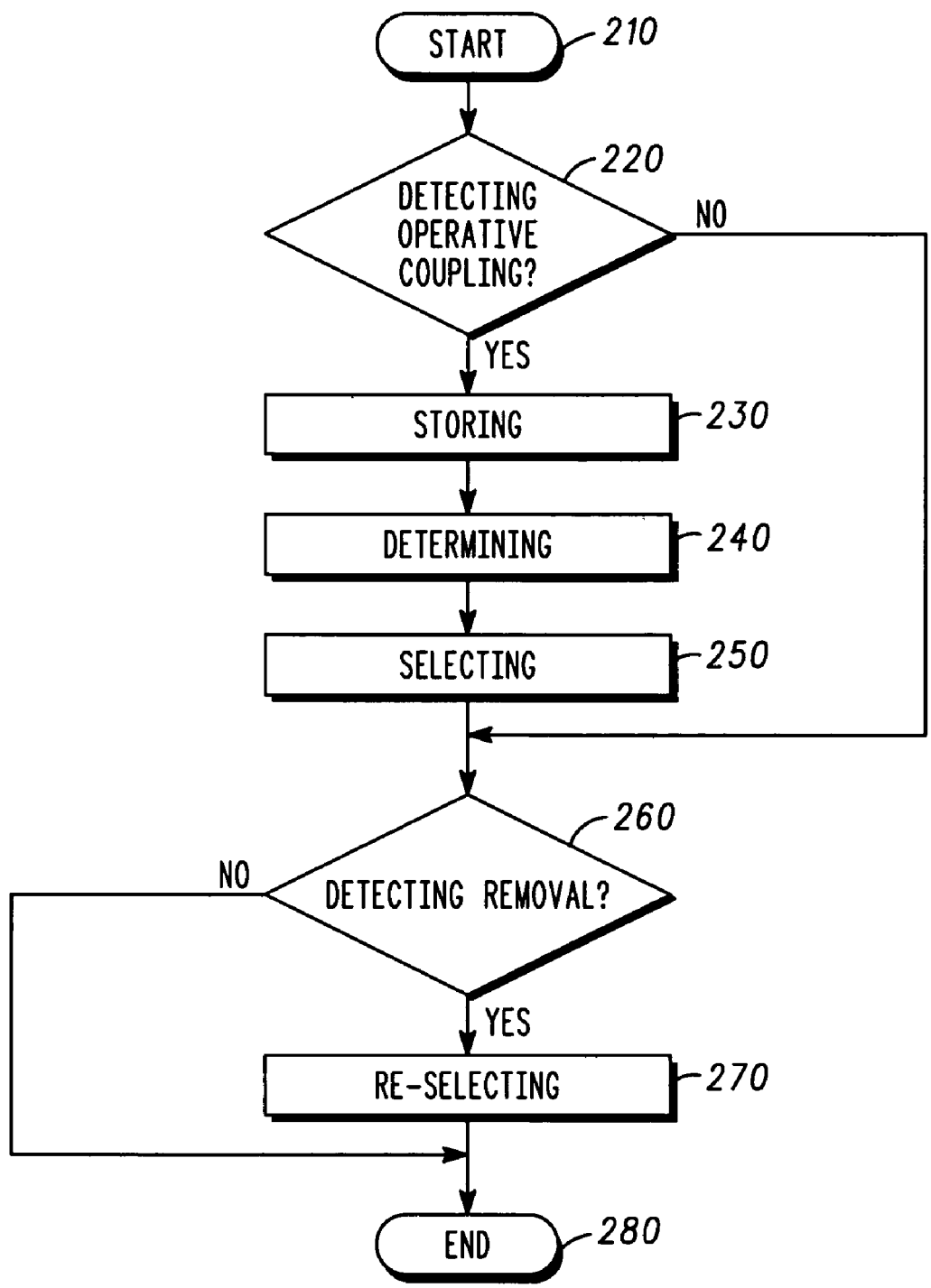
FIG. 2 is a flow diagram illustrating a method for automatically selecting features of accessories operatively coupled to a communications device of FIG. 1 in accordance with the present invention.

Referring to FIG. 2 there is a flow diagram illustrating a method 200 for automatically selecting features of accessories 120, 140 that are operatively coupled to the two-way radio 100. The method 100 is initialized by a start routine 210 that is invoked by an interrupt being provided to the processor 108 that occurs when an accessory is connected or disconnected (operatively coupled or decoupled) to one of the ports 110,112,114. After the start routine 210 the method 200 performs a step of detecting 220 for detecting operative coupling of at least two accessories (e.g. accessories 120, 140) to the two-way radio 100. In this regard, the step of detecting 220 detects only a new (additional) operative coupling.

If a new operative coupling occurs then the method 200 performs a storing step 230 thereby storing a sequence of the operative coupling of the accessories. For example, assume that the accessories 120,140 are a first coupled accessory F1 and at least one further coupled accessory F2, and the first coupled accessory F1 is operatively coupled to the two-way radio 100 before the further coupled accessory F2. Then, the storing step 230 stores a sequence indicating that the first coupled accessory F1 was operatively coupled to the two-way radio 100 before the further coupled accessory F2. This storing step 230 is achieved by software counting techniques that includes allocating incremental count values associated with each of the accessories 120,140 in an order in which the accessories 120,140 are operatively coupled to the two-way radio 100.

After the storing step 230 a determining step 240 provides for step of determining a common feature supported by the accessories. This determining is conducted by the processor 108 comparing features identified in memory locations of embedded memory devices (EMDs) 124,144 of each associated accessory 120, 140. For instance, as described above, if the three LSBs of the accessory feature field 128 are 111 and if the three LSBs of the accessory feature field 148 are 011, then by performing a simple AND Boolean operation the features associated with the LSB and second LSB would be identified as common features. Thus, an: audio output feature (indicated by the LSB) and an audio input feature (indicated by the second LSB) would be identified as common features for accessories 120, 140. Other common features can include a radio communications feature if both third LSBs were flagged as logic 1 (i.e for accessory feature fields 128 and 148 their respective third bit=set).

After the determining step 240 a selecting step 250 is performed to provide for selecting one of the accessories 120 or 140 to provide the common feature to the two-way radio 100, the selecting being determined by a sequence of the operative coupling. The selecting step 250 is characterized by the selecting the second coupled accessory 140 to provide the common feature to the two-way radio. As will be apparent to a person skilled in the art, each common feature may or may not also be a feature supported by the two-way radio without the accessories 120,140 being coupled thereto. Accordingly, when a common feature supported by the radio 100 is selected at the selecting step 250, the feature is temporarily unsupported by the two-way radio 100 and is only available via the selected accessory 120,140.

The selecting is performed by the two-way radio 100 directly controlling the common feature on a selected accessory 120, 140. For example, if accessory 120 is the selected accessory (the further coupled accessory F2), then processor 108 controls the accessory 120 via the conventional bus architecture 134. In this regard, the selected accessory 120 is addressed by use of the accessory identifier 126. Alternatively, if accessory 140 is the selected accessory (the further coupled accessory F2), then processor 108 controls the accessory 140 via the conventional bus architecture 154 and the accessory 140 is addressed by use of the accessory identifier 146.

After the selecting step 250 the method 200 performs a detecting removal test step 260. The detecting removal test step 260 is also performed if the step of detecting 220 does not detect a new (additional) operative coupling of an accessory to the two-way radio 100. If the detecting removal test step 260 does not detect a removal of one of the accessories (removal of an operative coupling of an accessory) the method 200 terminates at an end step 280. Alternatively, if the detecting removal test step 260 detect a removal of one of the accessories then a re-selecting step 270 performs a re-selecting one of the accessories to provide the common feature to the two-way radio 100. Hence, the re-selecting is effected by removal of one of the accessories and the re-selecting being determined by the sequence of the operative coupling. The method 200 then terminates at the end step 280 and will be re-invoked if an interrupt is provided to the processor 108 when an accessory is connected or disconnected to one of the ports 110,112,114.

During the re-selecting step 270, the method 200 normalizes the incremental count values associated with each of the accessories that are still operatively coupled to the two-way radio 100. For example, if the first coupled accessory F1 is removed (operatively de-coupled from radio 100) then the count value for the further coupled accessory F2 is decremented by a count of one. All other accessories (e.g. a third operatively coupled accessory F3 operatively coupled via. Accessory port 114) would also have their count value decremented by a count of one.

If the two-way radio 100 is switched off ("powers down"), then for each operatively coupled accessory 120, 140 the incremental count values, accessory identifier 146 and accessory port addresses (for ports 110,112,114) to which the incremental count values are allocated, are stored in non-volatile memory of the processor 108. When the two-way radio 100 is again switched on ("powered up"), the processor 108 checks the incremental count values allocated to each of accessory port addresses. The processor 108 also checks for an Operative Coupling Change (OCC) to determine if the same accessory is operatively coupled to the same accessory port immediately before power down and immediately after powering up again. If no Operative Coupling Change OCC is determined then a selecting step is performed that is essential identical to the selecting step 250. However, if an Operative Coupling Change OCC is determined, then a user is requested, via the user interface circuitry 102, to select the operatively coupled accessory 120, 140 to perform a particular common feature. Thereafter, each operatively coupled accessory 120, 140 is allocated a respective refreshed incremental count value that is used when the method of 200 is invoked by an interrupt.

The present invention provides a method and communications device for automatically selecting common features of operatively coupled accessories 120, 140. In use, when a plurality of accessories are operatively coupled respective accessory ports 110,112 or 114 to allow communication between the accessories and the processor, the processor selects a selected one of the accessories to provide a common feature supported by the accessories 120, 140. The selected one of the accessories, either accessory 120 or accessory 140, is determined by a sequence in which the accessories were operatively coupled to the ports. More specifically, the second or last coupled accessory provides the common feature. Hence, if a user operatively couples a first accessory and later a second accessory to the two-way radio 100, then any common features will be provided by the second accessory. Later, if the user operatively couples a third accessory that also supports some or all of the common features, then the third accessory will provide the common features that it supports to the two-way radio. The present invention therefore advantageously provides automatically selecting which accessory provides common features in which it is presumed that a user desires the latest operatively coupled accessory to be the accessory providing the common features.

The detailed description provides a preferred exemplary embodiment only, and is not intended to limit the scope, applicability, or configuration of the invention. Rather, the detailed description of the preferred exemplary embodiment provides those skilled in the art with an enabling description for implementing a preferred exemplary embodiment of the invention. It should be understood that various changes may be made in the function and arrangement of elements without departing from the spirit and scope of the invention as set forth in the appended claims.

We claim:

1. A method for automatically selecting features of accessories operatively coupled to a communications device, the method comprising:
   detecting operative coupling of at least two accessories to the communications device, the accessories being operatively coupled to respective accessory ports of the communications device; determining a common feature supported by the accessories; and selecting one of the accessories to provide the common feature to the communications device, the selecting being determined by a sequence of the operative coupling; wherein the common features include a radio communications feature.

2. A method, as claimed in claim 1, wherein the detecting further includes storing the sequence of the operative coupling of the at least two accessories, wherein the accessories are a first coupled accessory and at least one further coupled accessory, the first coupled accessory being operatively coupled to the communications device before the further coupled accessory.

3. A method, as claimed in claim 1, wherein the selecting is characterized by the communications device directly controlling the common feature on a selected accessory.

4. A method, as claimed in claim 1, wherein the selecting is characterized by the selected accessory being addressed by use of an accessory identifier stored in an embedded memory of a selected accessory.

5. A method, as claimed in claim 1, wherein the selecting is characterized by selecting the second coupled accessory to provide the common feature to the communications device.

6. A method, as claimed in claim 1, wherein the storing includes allocating incremental count values associated with each of the accessories in an order in which the accessories are operatively coupled to the communications device.

7. A method, as claimed in claim 1, wherein the common features include audio communications.

8. A method, as claimed in claim 1, wherein the determining is characterized by comparing features identified in memory locations of embedded memories of each associated accessory.

9. A method, as claimed in claim 1, wherein the common features are features supported by the communications device without the accessories being coupled thereto.

10. A method, as claimed in claim 1, wherein the method includes a further step of re-selecting one of the accessories to provide the common feature to the communications device, the re-selecting being effected by removal of one of the accessories and the re-selecting being determined by the sequence of the operative coupling.

11. A communications device for automatically selecting features of accessories when operatively coupled thereto, the communications device comprising: a processor; a user interface operatively coupled to the processor; and accessory ports operatively coupled to the processor, wherein in use when at least two accessories are operatively coupled to respective ones of the ports to allow communication between the accessories and the processor, the processor selects a selected one of the accessories to provide a common feature supported by the accessories, the selected one of the accessories being determined by a sequence in which the accessories were operatively coupled to the ports; wherein the common features include a radio communications feature.

12. A communications device, as claimed in claim 11, wherein in use the processor stores the sequence of the at least two accessories being operatively coupled to respective ones of the ports, wherein the accessories are a first coupled accessory and at least one further coupled accessory, the first coupled accessory being operatively coupled to the communications device before the second coupled accessory.

13. A communications device, as claimed in claim 11, wherein the second coupled accessory provides the common feature.

14. A communications device, as claimed in claim 11, wherein the common feature is supported by the communications device without the accessories being coupled thereto.

15. A communications device, as claimed in claim 12, wherein in use the processor stores the sequence by allocating incremental count values associated with each of the accessories in an order in which the accessories are operatively coupled to the communications device.

16. A communications device, as claimed in claim 11 wherein in use the selected one of the accessories is determined by the processor comparing features identified in memory locations of embedded memories of each associated accessory that is operatively coupled to respective ones of the ports.

17. A communications device, as claimed in claim 12, wherein in use the processor provides for re-selecting one of the accessories to provide the common feature to the communications device, the re-selecting being effected by removal of one of the accessories and the re-selecting being determined by the sequence in which the accessories were operatively coupled to the ports.

* * * * *